United States Patent [19]

Kurata

[11] Patent Number: 4,633,731
[45] Date of Patent: Jan. 6, 1987

[54] STEERING SYSTEM EQUIPPED WITH STEERING WHEEL CENTER PAD ANTI-ROTATION MECHANISM

[75] Inventor: Hidenori Kurata, Zama, Japan

[73] Assignee: Nissan Motor Co., Ltd., Yokohama, Japan

[21] Appl. No.: 752,953

[22] Filed: Jul. 8, 1985

[30] Foreign Application Priority Data

Jul. 10, 1984 [JP]  Japan .................................. 59-143055

[51] Int. Cl.⁴ ........................... B62D 1/10; B62D 1/16
[52] U.S. Cl. .................................. 74/492; 74/484 R; 74/552; 200/61.54; 339/3 S
[58] Field of Search .................... 74/492, 484 R, 552; 200/61.54; 339/3 S

[56] References Cited

U.S. PATENT DOCUMENTS 4,485,371 11/1984 Yamada et al. ............... 74/484 R X

FOREIGN PATENT DOCUMENTS 57-163448 10/1982 Japan .
58-224854 12/1983 Japan ................................. 74/484 R
59-106346 6/1984 Japan ................................. 74/484 R

*Primary Examiner*—Allan D. Herrmann
*Attorney, Agent, or Firm*—Leydig, Voit & Mayer

[57] ABSTRACT

A hub portion of a steering wheel has coaxial upper and lower sleeve sections. Upper and lower internal gears are mounted on the sleeve sections by way of bearings. A bracket is fixedly mounted on the hub portion and rotatably carries thereon a pinion meshing with the upper and lower internal hears. The internal gears are made of the same material as that of which the bracket is made.

4 Claims, 2 Drawing Figures

STEERING SYSTEM EQUIPPED WITH STEERING WHEEL CENTER PAD ANTI-ROTATION MECHANISM

BACKGROUND OF THE INVENTION

1. Field of the Invention

The present invention relates in general to steering systems for road vehicles and more particularly to a steering system of the type equipped with an anti-rotation mechanism for holding a steering wheel center pad, etc. stationary irrespective of rotation of a steering wheel.

2. Description of the Prior Art

A steering system equipped with such an anti-rotation mechanism, as disclosed in Japanese Provisional Utility Model Publication No. 57-163448, includes a pair of upper and lower internal gears, the upper one of which is screwed to an upper end of a jacket or column of a steering column assembly and the lower one of which is rotatably mounted on a hub portion of a steering wheel. On the hub portion of the steering wheel there are fixedly mounted a plurality of brackets each of which in turn rotatably carries thereon a pinion meshed with the teeth of both the upper and lower internal gears so that upon rotation of the steering wheel, the pinions rotate about the axis thereof while at the same time revolving about the steering shaft for thereby holding the upper internal gear and a steering wheel center pad, etc. mounted on the upper internal gear stationary irrespective of rotation of the steering wheel.

In this kind of steering system, there has been a necessity of providing a suitable clearance between the upper internal gear and the hub portion for compensating for the difference in thermal expansion therebetween and thereby keeping them smoothly rotatable relative to each other at all times. The necessity of such a clearance may however lead to the problem that the axis of revolution of the pinion about the steering shaft is misaligned with the axes of rotation of the upper and lower internal gears to result in play of the upper internal gear. Furthermore, since the upper and lower internal gears, the bracket, etc. are respectively made of suitable resinous materials, variations of temperature will cause changes in engagement of the pinions and the upper and lower internal gears due to the difference in thermal expansion or contraction therebetween, resulting in further play of the upper internal gear. Since the upper internal gear is adapted to mount thereon the steering wheel center pad, etc., such play of the upper internal gear inevitably deteriorates the quality of the steering system.

SUMMARY OF THE INVENTION

In accordance with the present invention, there is provided a novel and improved steering system. The steering system comprises a steering wheel whose hub portion is formed with coaxial upper and lower sleeve sections. Upper and lower internal gears are mounted on the sleeve sections by way of bearings. A bracket is fixedly mounted on the hub portion and rotatably carries thereon a pinion meshing with the upper and lower internal gears. The upper and lower internal gears are made of the same material as that of which the bracket is made.

The above structure is effective for solving the above noted problem inherent in the prior art device.

It is accordingly an object of the present invention to provide a novel and improved steering system having a steering wheel center pad anti-rotation mechanism which can assuredly prevent play of the steering wheel center pad.

It is another object of the present invention to provide a novel and improved steering system of the above mentioned character which can attain smooth and accurate engagement of a pinion and upper and lower internal gears at any time without being affected by variations of temperature.

It is a further object of the present invention to provide a novel and improved steering system of the above mentioned character which makes it possible to install the upper and lower internal gears on a hub portion of a steering wheel without providing any substantial clearance therebetween.

BRIEF DESCRIPTION OF THE DRAWINGS

The features and advantages of the steering system according to the present invention will become more clearly appreciated from the following description taken in conjunction with the accompanying drawings, in which.

DETAILED DESCRIPTION OF THE PREFERRED EMBODIMENT

Figure 1:
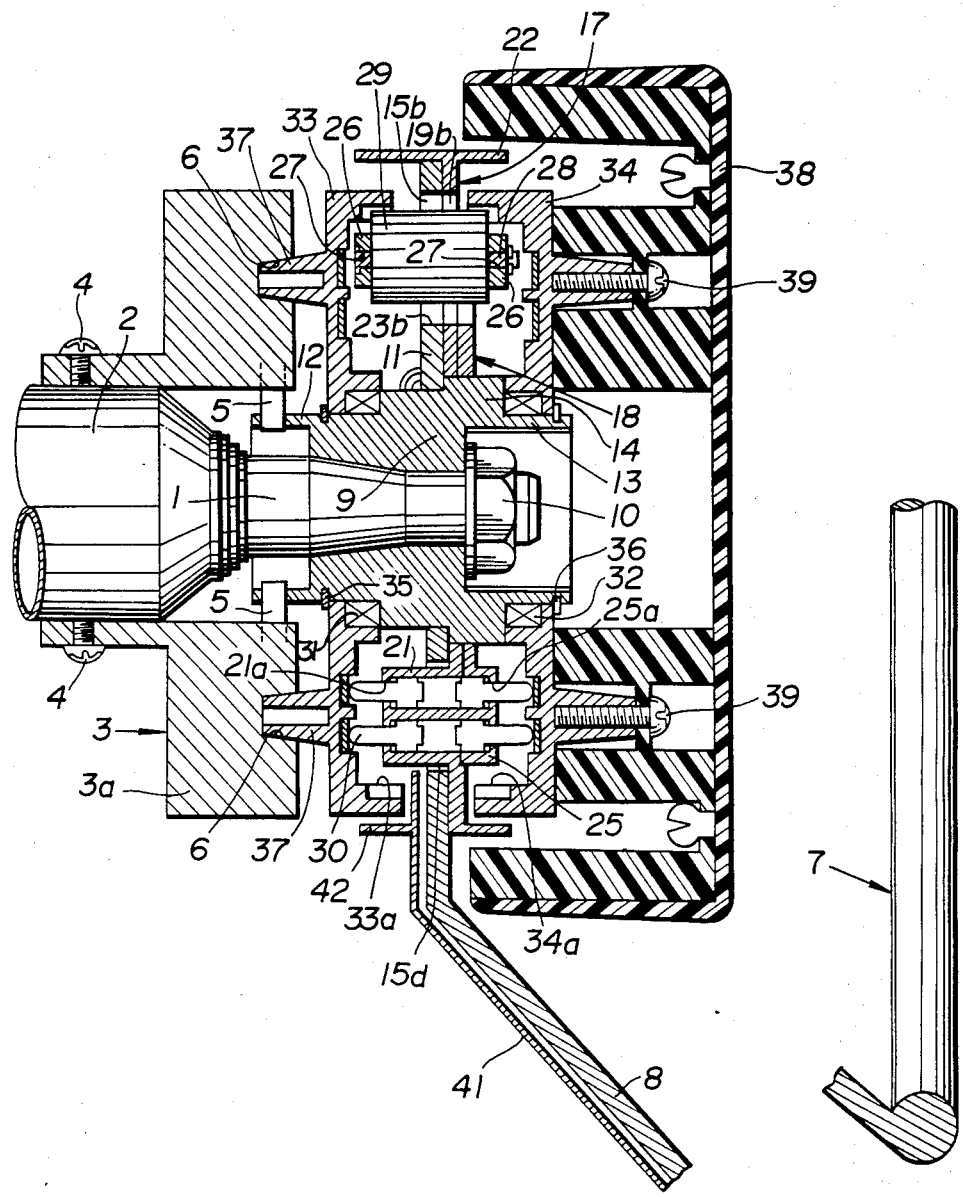
FIG. 1 is a fragmentary sectional view of a steering system according to an embodiment of the present invention.
Figure 2:
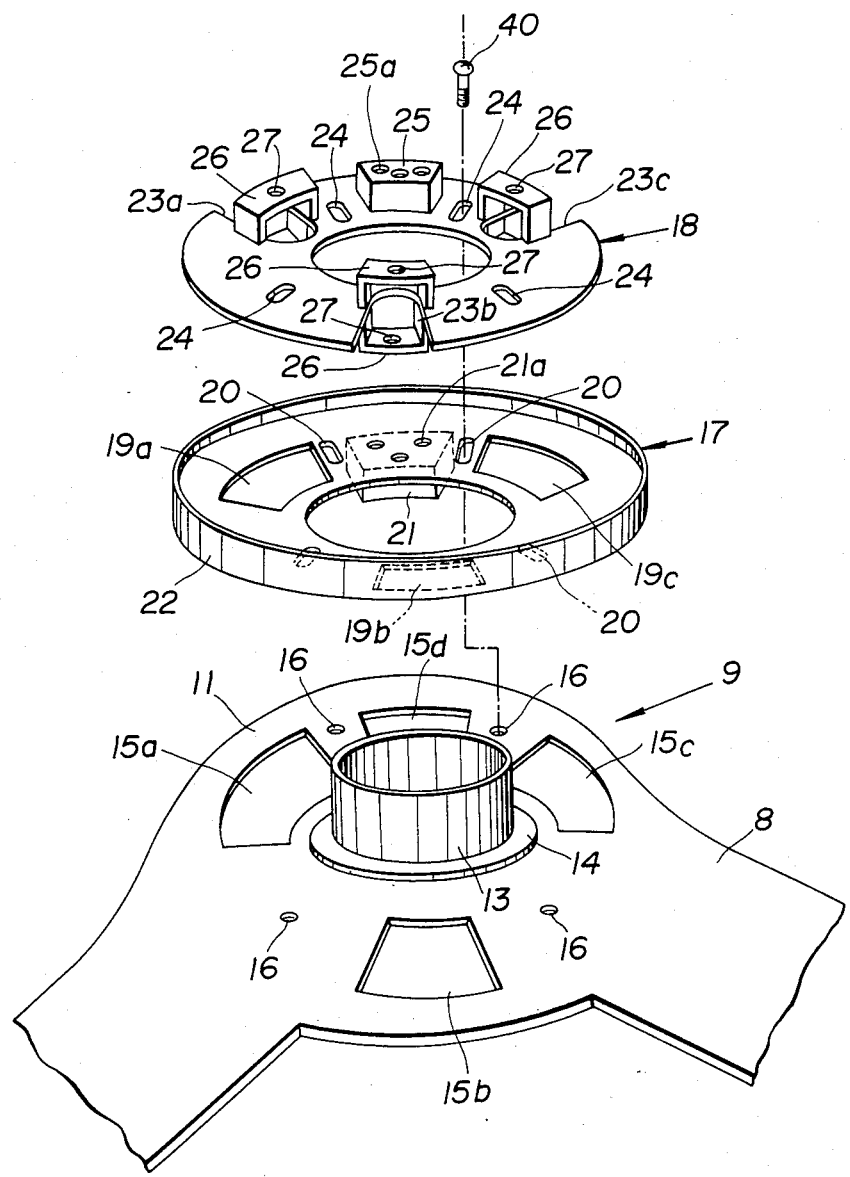
FIG. 2 is an exploded view of an important portion of the steering system of FIG. 1.

Referring to FIGS. 1 and 2, a steering system according to an embodiment of the present invention is shown as comprising a steering shaft 1 which is concentrically surrounded by a jacket or column 2 which is in turn supported on a vehicle body by means of a column bracket or the like though not shown in the drawing. On the upper end portion of the column 2 there is mounted a pre-amplifier 3 consisting of an annular casing 3a in a manner to surround the column 2. The pre-amplifier 3 constitutes part of a light communication device for the steering system and is fixedly attached to the upper end portion of the steering column 2 by means of a plurality of screws 4. The pre-amplifier 3 is provided at the inner peripheral part thereof with a plurality of cams 5. The pre-amplifier casing 3a is formed at the upper end thereof with a pair of taper holes 6, 6 which is preferably arranged at diametrically opposed positions for the purpose which will be described hereinafter.

A steering wheel is generaly indicated by the reference numeral 7 and includes a spoke portion or portions 8 and a hub portion 9. The steering wheel 7 is mounted at the hub portion 9 on the upper end of the steering shaft 1 and fastened thereto by means of a nut 10. The hub portion 9 includes an annular flange section 11, to the outer periphery of which is connected the spoke portion or portions 8, and coaxial upper and lower sleeve sections 13, 12 projecting upwardly and downwardly from the inner periphery of the flange section 11, respectively. The upper sleeve section 13 is partly increased in diameter at 14 to mount thereat a disk-shaped gear cover 17 and a disk-shaped bracket 18. The annular flange section 11 has first, second, third and fourth fan-shaped openings 15a-15d which are arranged in a circular array as shown in FIG. 2. The annular flange section 11 also has a plurality of threaded holes 16 which are respectively located between the adjacent two of the fan-shaped openings 15a–15d. The disk-shaped gear cover 17 is formed with a plurality of fan-shaped openings 19a–19c and a plurality of elongated openings 20 at the places corresponding to the first to third fan-shaped openings 15a–15g and the threaded holes 16, respectively. At the place corresponding to the fourth fan-shaped opening 15d the disk-shaped gear cover 17 has a downward projection 21 formed with a plurality of openings 21a. The disk-shaped gear cover 17 further has an upward flange 22 at the outer periphery thereof. On the other hand, the disk-shaped bracket 18 is made of a suitable synthetic resinous material such as for example polycarbonate and has a plurality of notches 23a–23c and a plurality of elongated openings 24 at the places corresponding to the first to third fan-shaped openings 15a–15c and the threaded openings 16, respectively. At the place corresponding to the fourth fan-shaped opening 15d the disk-shaped bracket 18 has an upward projection 25 formed with a plurality of openings 25a each of which is axially aligned with corresponding one of the openings 21a. The disk-shaped bracket 18 is of one-piece and also has plural pairs of bracket sections 26 of a U-like cross section in such a manner that each pair of the bracket sections 26 are respectively located on the opposite sides of the disk-shaped bracket 18 to straddle each one of the notches 23a. Each bracket section 26 has at the central part thereof an axial opening 27 in such a manner that the openings 27 of each pair of the bracket sections 26 are axially aligned with each other. Each pair of the bracket sections 26 rotatably carries thereon a pinion 29 by means of a shaft 28 passing through each pair of the openings 27, while a plurality of contactors 30 are disposed in the openings 21a, 25a of the downward and upward projections 21, 25 in such a manner that each contactor 30 has opposite ends protruding from the openings 21a, 25a. The gear cover 17 and bracket 18 are fixedly attached to the hub portion 9 by means of a plurality of screws 40 which are screwed into the threaded holes 16 through the elongated openings 20, 24.

On the sleeve sections 12, 13 there are rotatably mounted by way of bearings 31, 32 a lower internal gear 33 and an upper internal gear 34, respectively. The internal gears 33, 34 are prevented from slipping off from the sleeve sections 12, 13 by means of snap rings 35, 36, respectively. The lower internal gears 33 has at the lower end thereof a pair of anchor legs 37, 37 which are tapered correspondingly to the taper holes 6, 6 of the pre-amplifier casing 3a so as to fit in same without any clearance therebetween. By the engagement of the anchor legs 37, 37 and the holes 6, 6, the lower internal gear 33 is held rotatively stationary relative to the pre-amplifier casing 3a and therefore the column 2. On the upper internal gear 34 there are fixedly mounted a steering wheel center pad 38 by means of a plurality of screws 39, 39.

The internal gears 33, 34 are made of the same synthetic resinous material, e.g. polycarbonate, as that of which the bracket 18 is made and have teeth 33a, 34a which are of the same pitch circle diameter and diametrical pitch. Each of the pinions 29 is made of a suitable synthetic resinous material such as for example nylon elastomer and is constructed and arranged to mesh with the teeth of either of the internal gears 33, 34. The internal gears 33, 34 are electrically connected to each other by means of the contactors 30.

In the meantime, indicated by the reference numeral 41 is an ornamental or decorative member attached to the spoke portion or portions 8 and having a covering section 42 covering the space between the steering wheel 7 and the lower internal gear 33.

In the foregoing, it is to be noted that the upper and lower internal gears 34, 33 are mounted on the common part, i.e. the hub portion 9 by way of the bearings 32, 31. This makes it possible to attain axial alignment of the upper and lower internal gears 34, 33 and the steering shaft 1 accurately and assuredly.

It is further to be noted that the pinions 29 are carried on the bracket sections 26 of the disk-shaped bracket 18 which is in turn fixedly mounted on the hub portion 9 of the steering shaft 7. By this, the axis of revolution of the pinions 29 about the steering shaft can be accurately aligned with the axes of rotation of the internal gears 33, 34 to provide smooth and uniform engagement of the pinions 29 and the internal gears 33, 34.

It is still further to be noted that the internal gears 33, 34 are rotatably mounted on the hub portion 9 by interposing therebetween the bearings 31, 32. By this, it becomes possible to rotatably mount the internal gears 33, 34 on the hub portion 9 without providing any substantial clearance therebetween.

It is yet further to be noted that the bracket 18 and the internal gears 33, 34 are all made of the same material. By this, smooth and uniform engagement of the pinions 29 and the internal gears 33, 34 can be attained at any time without being affected by variations of temperature since dimensional variations of the internal gears 33, 34 due to variations of temperature are accompanied by similar dimensional variations of the bracket 18.

What is claimed is:

1. A steering system comprising:
   a stationary column having an upper end portion;
   a steering shaft concentrically surrounded by said column and having an upper end portion;
   a steering wheel having a hub portion at which it is mounted on the upper end portion of said steering shaft for rotation therewith;
   said hub portion having an annular flange section and a pair of upper and lower sleeve sections projecting upwardly and downwardly from the inner periphery of said flange section;
   a pair of upper and lower internal gears mounted on said upper and lower sleeve sections, respectively, said lower internal gear being arranged axially and upwardly of said upper end portion of said column;
   a pair of bearings interposed between said upper and lower internal gears and said upper and lower sleeve sections, respectively;
   means extending axially between said upper end portion of said column and said lower internal gear for preventing rotation of said lower internal gear relative to said column;
   a bracket fixedly mounted on said hub portion; and
   a pinion rotatably carried on said bracket and meshing with said upper and lower internal gears;
   said upper and lower internal gears being made of the same material as that of which said bracket is made.
2. A steering system comprising:
   a stationary column having an upper end portion;
   a steering shaft concentrically surrounded by said column and having an upper end portion;
   a steering wheel having a hub portion at which it is mounted on the upper end portion of said steering shaft for rotation therewith;

said hub portion having an annular flange section and a pair of upper and lower sleeve sections projecting upwardly and downwardly from the inner periphery of said flange section;

a pair of upper and lower internal gears mounted on said upper and lower sleeve sections, respectively, said lower internal gear being arranged axially and upwardly of said upper end portion of said column;

a pair of bearings interposed between said upper and lower internal gears and said upper and lower sleeve sections, respectively;

means extending axially between said upper end portion of said column and said lower internal gear for preventing rotation of said lower internal gear relative to said column;

a bracket having a plurality of integral bracket sections and fixedly mounted on said hub portion; and a plurality of pinions rotatably carried on said bracket sections and each meshing with said upper and lower internal gears;

said upper and lower internal gqars and said bracket being formed from the same material;

3. A steering system as set forth in claim 2 in which said bracket is disk-shaped to encircle said hub portion.

4. A steering system comprising:
a stationary column having an upper end portion;
a steering shaft concentrically surrounded by said column and having an upper end portion;
a steering wheel having a hub portion at which it is mounted on the upper end portion of said steering shaft for rotation therewith;
said hub portion having an annular flange section and a pair of upper and lower sleeve sections projecting upwardly and downwardly from the inner periphery of said flange section;
a pair of upper and lower internal gears mounted on said upper and lower sleeve sections;
a pair of bearings interposed between said upper and lower internal gears and said upper and lower sleeve sections, respectively;
means for preventing rotation of said lower internal gear relative to said column;
a bracket having a plurality of integral bracket sections and fixedly mounted on said hub portion, said bracket being disk-shaped to encircle said hub portion; and
a plurality of pinions rotatably carried on said bracket sections and each meshing with said upper and lower internal gears;
said upper and lower internal gears and said bracket being formed from the same material;
said bracket having a plurality of notches corresponding in number to said pinions, said bracket sections being of a U-like cross section and forming plurality pairs in such a manner that each pair of said bracket sections is located on the opposite sides of said bracket to straddle each of said notches, each of said pinions being arranged to pass through each of said notches.

* * * * *